July 9, 1963  P. A. M. GELL  3,097,251
MEANS FOR MAKING FIBRES OF VITREOUS MATERIAL
Filed Oct. 11, 1960
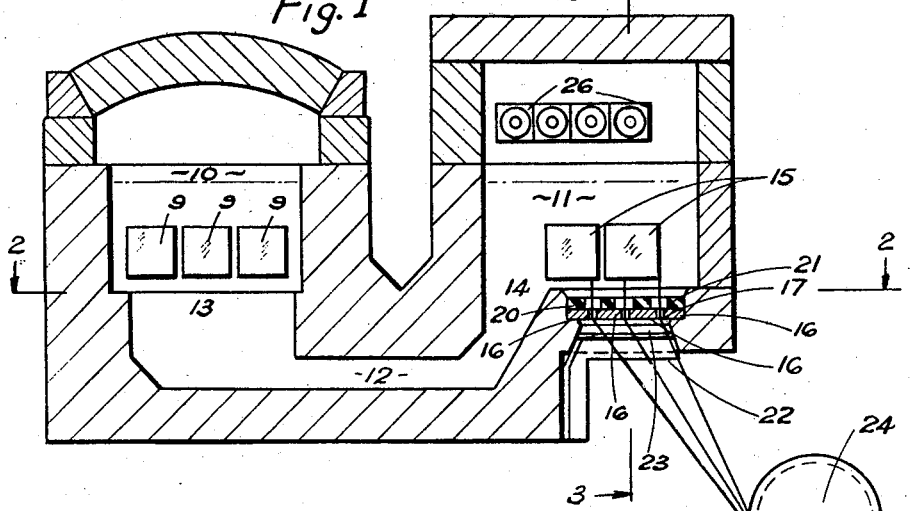
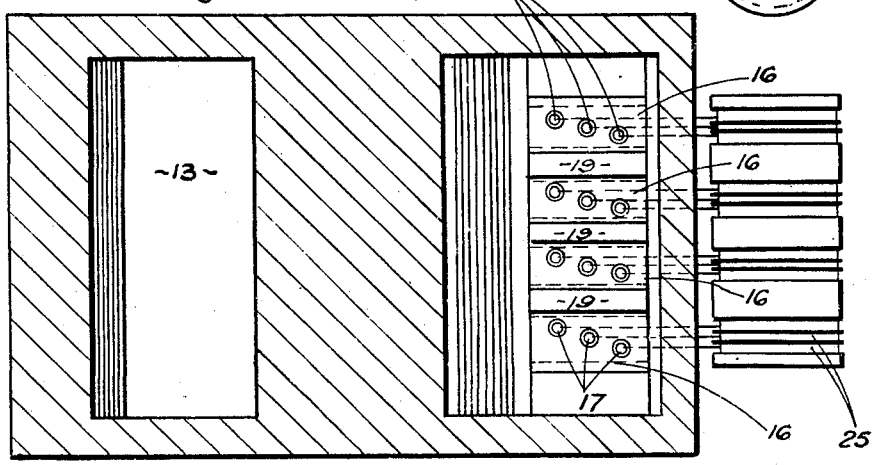
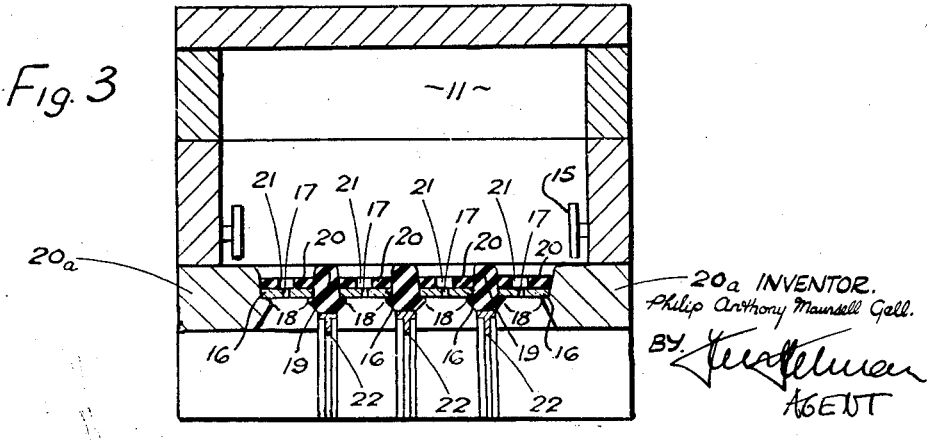
INVENTOR.
Philip Anthony Maundell Gell.
BY
AGENT United States Patent Office 3,097,251
Patented July 9, 1963

3,097,251
MEANS FOR MAKING FIBRES OF VITREOUS MATERIAL
Philip A. M. Gell, Kinver, near Stourbridge, England, assignor to Elemelt Limited, Bilston, England, a British company
Filed Oct. 11, 1960, Ser. No. 61,953
7 Claims. (Cl. 13—6)

This invention relates to the making of fibres of glass or other vitrifiable material which is or can be rendered electrically conductive in the molten state (all hereinafter referred to as vitreous material).

Hitherto the usual method of making fibres of vitreous material such as glass, consists in first converting the raw materials into the form of glass either in the form of glass marbles, glass rod or broken fragments of glass usually termed cullet, all of which when produced are in the cold vitrified state. The glass so formed is subsequently re-heated in a furnace other than that in which the raw materials have been converted into glass and the molten glass is drawn out from this re-heating furnace in the form of fibres.

The production of glass from its raw materials is at present most widely effected in continuous glass melting and refining furnaces which are heated by burners fed with liquid or gaseous fuel and such furnaces cannot be efficiently operated unless there is a substantial throughput of glass. By substantial throughput is meant a throughput in excess of about 600 lbs. per hour.

In making fibres of glass the physical difficulty of simultaneously drawing a large number of fibres from a supply of molten glass as well as limitations in the drawing speed which is practicable, results in a typical throughput or rate of withdrawal of glass from the molten bulk of about 40 lbs. per hour, and it will therefore be evident that it is not possible efficiently to conduct the manufacture of glass fibres by a continuous process starting with the raw glass making or batch materials melting and refining these into glass in a fuel fired melting and refining furnace and drawing off the molten glass from this furnace to produce the glass fibres.

A proposal has been made to manufacture glass fibres by drawing the glass from a molten bulk which is maintained in the molten state by the passage therethrough of electric current but in this case the molten glass was made and refined from the batch materials in a separate furnace not in continuous communication with the electrically heated furnace from which drawing operations took place.

It is thus apparent that these prior methods of making glass fibres either as used or as proposed involve transference of glass either in the solidified vitrified state or in the molten state from one furnace chamber to another with attendant heat loss. Furthermore, it is apparent that some suitable form of conveying apparatus requires to be provided in association with the glass making furnace, i.e. that in which initial melting and refining operations are conducted and the re-heating or glass drawing furnace from which the glass fibres are drawn out.

The object of the present invention is to avoid or reduce these difficulties by providing a new or improved method by means of which fibres of vitreous material can be made without involving the discontinuity inherent in the above described previously practiced and proposed methods, starting from the raw or batch materials from which the vitreous materials is composed, and thereby avoiding or reducing heat loss and increasing thermal efficiency.

According to the invention fibres of vitreous material are made by heating a molten mass of the material in a furnace chamber by the passage of a primary electric current through this mass to which fresh batch materials are added continuously or intermittently, withdrawing refined material from this mass through a duct or opening leading from the furnace chamber to a further chamber, passing a secondary electric current through the material disposed along the withdrawal path to control the reduction in temperature of the material which occurs along this path in the direction of withdrawal, passing a tertiary electric current through the molten material disposed in the further chamber and at a locality adjacent to a drawing station in said further chamber, regulating the tertiary current to attain in the material a viscosity which is somewhat but not greatly below the upper limit of viscosity which will permit the material to be drawn to the size of fibres required, and drawing the material through a die at said drawing station to produce a fibre or fibres of the material.

Said primary electric current will be regulated to produce a temperature in the furnace chamber which produces refining of the molten material contained therein at a rate which is commensurate with the rate of withdrawal of the material from this chamber (the throughput). It will be appreciated that since the throughput is relatively small compared with that obtaining in melting and refining operations wherein the molten vitreous material is to be utilized for the production of forms other than fibres, for example, articles, rods, tubes or sheets, it becomes possible to reduce the quantity of molten material present in the furnace chamber or to reduce the temperature, and hence the rate at which refining takes place or to reduce both these factors with a consequent reduction in the loss of heat from the furnace chamber.

The danger of producing glass in the drawing station which is not homogeneous with respect to the temperatures obtaining in distributed points throughout its bulk is avoided or materially reduced by the very precise control which can be exerted over the fall in temperature taking place between the region of the furnace chamber from which the vitreous material is withdrawn and the drawing station in the further chamber.

Preferably, the primary electric current is communicated to the vitreous material over areas extending substantially to the lateral and lower boundaries of the mass of glass contained in the furnace chamber. In the case of the tertiary current this again is preferably communicated to the glass over a substantial area at each end of the drawing station such areas extending up to or beyond boundaries of the drawing station from which vitreous material is withdrawn from the further chamber through the die, whereby the whole of the vitreous material contained in the drawing station is traversed by tertiary current.

Further, according to the invention I provide a furnace for carrying out the method above described comprising a furnace chamber having horizontally spaced electrodes for passing a primary electric current though viteous material in this chamber these electrodes being disposed at opposite ends of an outlet opening in the bottom wall or at some other suitable position in the furnace chamber at which refined vitreous material is normally present, a further chamber connected by a duct with the furnace chamber at said outlet opening, one or more electrodes in the further chamber or duct for passing a secondary electric current through the vitreous material disposed in the duct, the further chamber having an outlet in its bottom wall, or at some other suitable position, which outlet is provided with a die adapted to enable a fibre or fibres of the vitreous material to be withdrawn from the further chamber, and tertiary electrodes at opposite sides or ends of the die for passing a tertiary electric current through the vitreous material adjacent thereto in the further chamber.

The term "end" in the foregoing statement and herein is used to denote the edge or boundary of the opening in the furnace chamber and in the further chamber which extends transversely of the current path between the electrodes disposed in these chambers. The dimensions of the opening may be such that the spacing between its "ends" may in fact be less than the spacing between its "sides."

The die may comprise a metal die plate, such die plate being provided with or associated with one or more members of electrical insulating and refractory material arranged to prevent or reduce passage of the tertiary current through the die plate in preference to passage through the overlying layer of vitreous material. The said members may comprise one or more bars of electrically insulating and refractory material extending transversely of the tertiary current path and dividing the die plate into a plurality of sections.

This arrangement prevents there being a substantially continuous metallic electrically conducting path between the electrodes in the further chamber which communicate the tertiary current to the glass contained in the drawing station.

As a possible alternative or in addition there may be provided a block or plate of electrically insulating and refractory material through which extends a plurality of holes in register with and of larger cross section than respectively associated holes in the die plate through which the fibres are drawn.

Owing to the ability to effect precise control as to the temperature of the glass in the drawing station, that is in the region of the further chamber immediately adjacent to the block, it becomes possible to ensure that this temperature shall be only just above that at which the vitreous material becomes too viscous for drawing and erosion of the material of the refractory block bordering on the holes extending therethrough is thus avoided or reduced by avoiding an excessively high temperature.

The necessity to line the holes in the refractory block with platinum bushes or sleeves as well as the necessity for using a die plate of platinum is thus avoided, although this latter expedient can be adopted if desired. The die plate may thus be made of heat resisting steel and may have unlined or unbushed die holes extending through it.

The invention is illustrated in the accompanying drawings wherein:

FIGURE 1 is a view in vertical cross section through one construction of furnace in accordance with the invention for carrying out the method thereof, the drawing of fibres and their winding on to a drawing drum being illustrated diagrammatically.

FIGURE 2 is a plan view of the same construction on the line 2—2 of FIGURE 1.

FIGURE 3 is a further view in vertical cross section on the line 3—3 of FIGURE 1.

The general construction of the furnace and its principle of operation is similar to that described and claimed in U.S. Patent No. 2,899,476 with certain modifications as hereinafter described.

Before referring to these modifications it is for convenience pointed out that the furnace comprises a furnace chamber 10 in which the batch materials necessary for the making of the glass or other vitreous material are charged in any suitable manner. These materials are subjected to refining by the passage therethrough of primary electric current between sets of electrodes 9 disposed at opposite ends of the furnace chamber 10.

Preferably these electrodes extend substantially to the lateral and lower boundaries of the furnace chamber 10 so that the whole of the cross section of glass lying between the opposed sets of electrodes at the two ends of the furnace chambers are traversed by the primary current and the requisite pattern of convective glass flow is set up to establish proper refining of the glass.

The furnace further comprises a further chamber 11 which is connected with the furnace chamber 10 by way of a duct 12, one end of which communicates with the chamber 10 through an opening 13 in the bottom of this chamber and through an opening 14 in the bottom of the further chamber at the side thereof nearest the chamber 10. The further chamber 11 contains at opposite ends respectively sets of electrodes 15 enabling a current, herein referred to as the tertiary current, to be passed horizontally through a body of glass situated in between the sets of electrodes 15.

The electrodes 9 in the chamber 10 and the electrodes 15 in the chamber 11 may be connected with a supply circuit for feeding alternating electric current to the electrodes. The supply circuit may include a transformer having its primary winding connected to the mains or a suitable alternating current generator and the terminals on its secondary winding connected to respective sets of electrodes 9.

A further transformer may be provided having its primary windings similarly fed from the mains or an alternating current generator and its secondary terminals connected to respective sets of electrodes 15. A connection may be made between these two supply circuits incorporating a third transformer to provide a voltage difference between the sets of electrodes 9 on the one hand and the sets of electrodes 15 on the other hand so as to establish a secondary current through the glass contained in the duct 12 and arrangements similar to those disclosed in FIGURE 4 of the previously mentioned U.S. Patent No. 2,899,476, may be provided for connecting the electrical "centre" of the supply circuit for the electrodes 9 to the electrical "centre" of the supply circuit for the electrodes 15 so as to ensure that the current path through the glass in the duct 12 shall, so far as possible, not be displaced predominately to one side or the other side of the duct.

It will be understood that the opening 13 in the bottom of the chamber 10 may be of the dimensions illustrated in FIGURE 2 relatively to the dimensions of the chamber itself, but it could be dimensioned in accordance with the opening described and claimed in my previously mentioned co-pending application for promoting effective elimination of seed from glass withdrawn from the chamber 10 along the duct 12 to the chamber 11.

The electrodes included in the sets 9 and 15 may be constructed as described and claimed in U.S. Patent No. 2,843,644, the supporting stem of each electrode preferably being in accordance with the disclosure in U.S. Patent No. 2,843,644.

These forms of electrode construction, especially that forming the subject of U.S. Patent No. 2,843,644, are particularly advantageous when employed for the electrodes 15 since such construction promotes uniformity of temperature over the current communicating face of the electrode and hence also promotes uniformity of current density through the glass contained in the station between electrodes 15.

It is important that this glass shall have a high degree of uniformity as to its temperature so as to reduce to a minimum the likelihood of the fibers breaking during drawing in consequence of the glass attaining too low a temperature locally and hence too high a viscosity for satisfactory drawing to take place.

Referring now to the arrangements for drawing the fibres, these comprise a die which consists of a die plate preferably divided into a plurality of sections 16, each containing a plurality of die holes 17, the cross section dimensions of which have been deliberately exaggerated in the drawing for the purpose of clarity in illustration. The die plate sections may be made of a heat resisting alloy steel and the holes may be unlined or un-bushed.

The die plate sections 16 are supported on ledges 18 formed on bars 19 and on the vertical inner edges of the marginal portions 20A of the bottom wall of the chamber 11. The bars 19 are made of refractory and electrically insulating material and it will be observed that in between each die plate section 16, the shortest current path is that lying immediately adjacent to the upper surface of each bar and that owing to the particular cross sectional shape of each bar, which is high relatively to its width, the current path is of substantial length and thereby prevents or reduces any tendency for the tertiary current to be diverted or short-circuited through the die plate sections 16.

An alternative or additional expedient for avoiding or reducing this undesirable effect is the provision of plates 20 of refractory and electrically insulating material, which plates rest on top of the die plate sections 16 and have holes 21 in register with corresponding holes 17 of the die plate sections, but of somewhat larger diameter so that fibre formation is produced substantially by the die plate holes alone.

The bars 19 are supported or reinforced structurally by underlying girders 22 of metal such as steel, these girders conveniently being of T section and extending from side to side of the aperture 23 in the bottom wall of the further chamber 11 beneath the die plate sections.

The fibres let out from the die holes 17 may be drawn by winding them on to a rotary drum 24 which may be divided into sections for receiving individual fibres by flange means indicated generally at 25, or alternatively if each die plate section contained a larger number of die holes which would produce some overlapping of the fibres these may be wound without separation from each other on to the drawing drum.

The operating temperatures in the various parts of the furnace will vary according to the type of glass or other fibrous material undergoing melting, refining and drawing.

For a soda lime glass a typical value of temperature in the furnace chamber 10 immediately above the opening through which the glass is withdrawn would be from 1550° C. to 1600° C.

Controlled temperature reduction through the duct 12 to the further chamber 11 produced by regulation of the secondary current through the glass in the duct may result typically in the temperautre of glass in the further chamber at its entry there into being about 1000° C.

The tertiary current passing between the sets of electrodes 15 may be regulated to produce a glass temperature in the drawing station that is to say in the body of glass disposed immediately above the recessed part of the bottom wall of the chamber 11 in which the die plate sections 16 are mounted in the range 900° C. to 1000° C. or otherwise as necessary for the temperature of the fibres required to be drawn.

This temperature allows the glass to be sufficiently fluid to pass through the holes in the refractory block or plate 20 and through the die holes in the die plate sections in the form of droplets.

In the chamber 11 auxiliary heating means in the form of burners 26 may be provided by the level of the molten glass in such chamber, this being fed with fluid fuel regulated to maintain the temperature in the chamber 11 above the glass or other vitreous material therein at a value which is substantially equal to that of the glass or such material or to a value slightly greater than this temperature.

Regulation of the primary, secondary and tertiary currents may be carried out in any suitable manner, as for example by the provision of supply transformers equipped with facilities for tap changing, or otherwise varying the output voltage from the terminals of the secondary windings or other suitable regulating means associated with such transformers.

What I claim then is:

1. In a glass melting furnace, the combination of a chamber for containing a body of molten glass, said chamber having an outlet opening, electrode means in said chamber at opposite boundaries of said outlet opening for passing electric current through said glass along a flow path adjacent to said outlet opening and between opposite boundaries thereof, a metallic die disposed in said outlet opening and having die holes for passage therethrough of glass-fibre-forming streams, and electrically insulating barrier means also disposed in said outlet opening and in an electric current diversion path extending from one of said electrode means through said die to the other of said electrode means.

2. In a glass melting furnace, the combination of a chamber for containing a body of molten glass, said chamber including a bottom wall having an outlet opening, electrode means in said chamber at one pair of opposite boundaries of said outlet opening to pass electric current through said body of glass along a flow path extending between said opposite boundaries and adjacent to said bottom wall, a metallic die disposed in said outlet opening having die holes for passage therethrough of glass-fibre-forming streams, and electrically insulating barrier means also disposed in said outlet opening and extending crosswise thereof between the other pair of opposite boundaries of said outlet opening so as to be interposed in an electric current diversion path itself extending from one of said electrode means through said die member to the other of said electrode means.

3. In a glass melting furnace, the combination of a chamber for containing a body of molten glass, said chamber having an outlet opening, means in said chamber for passing electric current through said glass along a flow path adjacent to said outlet opening, a metallic die at said outlet opening having die holes for passage therethrough of glass-fibre-forming streams, said die comprising die sections spaced apart longitudinally to said flow path and at least one barrier member of electrically insulating material disposed between adjacent ones of said die sections and projecting inwardly of said chamber to prevent diversion of said electric current therethrough.

4. In a glass melting furnace, the combination of a chamber for containing a body of molten glass, said chamber having an outlet opening, meant in said chamber for passing electric current through said glass along a flow path adjacent to said outlet opening, a metallic die at said outlet opening having die holes for passage therethrough of glass-fibre-forming streams, and at least one barrier member of electrically insulating material overlying that face of said die member presented towards said body of glass in said chamber to prevent diversion of electric current through said die member, said barrier member having holes in overlapping relation with said die holes to permit of outflow of said streams therethrough.

5. In a glass melting furnace, the combination of a chamber for containing a body of molten glass, said chamber including a bottom wall having an outlet opening, electrode means in said chamber at opposite boundaries of said outlet opening to pass electric current through said body of glass along a flow path extending between said opposite boundaries and adjacent to said bottom wall, a metallic die at said outlet opening having die holes for passage therethrough of glass-fibre-forming streams, said die comprising spaced apart die sections and electrically insulating barrier means having a part disposed between said die sections and having a further part overlying those faces of said die sections presented towards said body of glass, said further part having holes in overlapping relation with said die holes.

6. In a glass melting furnace, the combination of a chamber for containing a body of molten glass, said chamber having an outlet opening, horizontally spaced electrode means in said chamber at opposite boundaries of said outlet opening for passing electric current through said glass along a flow path adjacent to said outlet opening, and a metallic die and at least one barrier member of electrically insulating material both disposed in said outlet opening, the die having a plurality of die holes for the passage therethrough of glass-fibre forming streams, and the barrier member being interposed in an electric current diversion path extending from one of said electrode means through the die to the other of said electrode means.

7. In a glass melting furnace, the combination of a chamber for containing a body of molten glass, said chamber having an outlet opening at its lower end and extending for at least the major proportion of the width and length of said chamber, horizontally spaced electrode means disposed respectively at one pair of opposite boundaries of said outlet opening, for passing current in a flow path adjacent to said outlet opening, and a structure in said outlet opening comprising metal die and electrically insulating barrier elements the former having a plurality of die holes for the passage therethrough of glass-fibre-forming streams, and the latter being interposed in an electric current diversion path extending from one of said electrode means through the die element to the other of said electrode means.

References Cited in the file of this patent
UNITED STATES PATENTS

| | | |
|---|---|---|
| 1,999,744 | Wadman | Apr. 30, 1935 |
| 2,692,296 | De Piolenc et al. | Oct. 19, 1954 |
| 2,926,208 | Eden | Feb. 23, 1960 |
| 2,928,887 | Eden | Mar. 15, 1960 |